United States Patent [19]

Boldrini et al.

[11] Patent Number: 5,199,547
[45] Date of Patent: Apr. 6, 1993

[54] METHOD AND DEVICE FOR UNLOADING PRODUCTS OFF A CONTINUOUSLY-MOVING CONVEYOR

[75] Inventors: Fulvio Boldrini, Ferrara; Antonio Gamberini, Bologna, both of Italy

[73] Assignee: G.D. Societa' Per Azioni, Bologna, Italy

[21] Appl. No.: 919,858

[22] Filed: Jul. 27, 1992

[30] Foreign Application Priority Data

Jul. 29, 1991 [IT] Italy .................. BO91 A 000285
Oct. 1, 1991 [IT] Italy .................. BO91 A 000348

[51] Int. Cl.⁵ ............................................. B65G 37/00
[52] U.S. Cl. ............................. 198/463.2; 198/468.6
[58] Field of Search ............ 198/463.2, 468.6, 468.01, 198/468.9, 468.11, 456, 457, 705

[56] References Cited

U.S. PATENT DOCUMENTS 4,325,476 4/1982 Eddy ........................ 198/468.11 X
4,558,779 12/1985 Schmitt et al. ................ 198/853 X
4,981,463 1/1991 Susini ......................... 198/468.1 X Primary Examiner—Joseph E. Valenza
Assistant Examiner—Cheryl L. Gastineau
Attorney, Agent, or Firm—Klauber & Jackson

[57] ABSTRACT

Products transported on a conveyor at substantially constant speed inside respective seats integral with the conveyor are fed through a passage located in a fixed position facing the path of the seats; the products being fed into the passage by means of an auxiliary seat located between the conveyor and the passage and designed to move along the path of and at the same speed as the conveyor and in selective alignment with each seat, and to stop in a position wherein it is aligned with the passage; and by means of a pusher constantly aligned with, and located on the opposite side of the conveyor in relation to, the auxiliary seat.

8 Claims, 2 Drawing Sheets

METHOD AND DEVICE FOR UNLOADING PRODUCTS OFF A CONTINUOUSLY-MOVING CONVEYOR

BACKGROUND OF THE INVENTION

The present invention relates to a method of unloading products off a continuously-moving conveyor.

More specifically, the present invention relates to a method of transferring products from a conveyor, by which the products are conveyed at substantially constant speed along a given path, to an unloading station located in a fixed position along said path and defined by a passage facing the conveyor, and preferably the input passage to a further conveyor.

The present invention is especially suitable for use on cigarette manufacturing machines, particularly packing machines, to which the following description refers purely by way of example.

Known cigarette packing machines present an output conveyor unit comprising a first and second conveyor cooperating at a given point of tangency, and a third conveyor having an input passage facing a portion of the second conveyor.

The first conveyor normally consists of a packing wheel having a number of peripheral seats, which, as the wheel is rotated about its axis, are fed through a loading station where each seat is fed with a packing blank and a preformed group of cigarettes.

Each blank is folded partially in a U about the group as it is inserted inside the seat, and is gummed as required and gradually folded by the packing wheel into a semifinished packet, which is normally completed by a final folding operation as the packet is transferred from the packing wheel to a respective seat on the second conveyor.

The second conveyor normally consists of stabilizing conveyor along which the gummed portions of each packet are at least partially dried for achieving a firm shape of the packet.

The third conveyor normally consists of a drying conveyor of such a length as to allow complete drying of the adhesive materials.

On known packing machines of the aforementioned type, the second conveyor is normally step-operated, so that no difficulty is encountered in transferring the packets from the second conveyor to the input passage of the third conveyor, which is effected in the interval between one step of the conveyor and the next.

SUMMARY OF THE INVENTION

It is an object of the present invention to provide a straightforward, low-cost, reliable method of transferring products in general, and packets of cigarettes in particular, between the second and third conveyors on a packing machine wherein the second conveyor is a continuously-moving type.

More specifically, it is an object of the present invention to a provide a straightforward, low-cost, reliable method of unloading products in general, and packets of cigarettes in particular, off a continuously-moving conveyor and through a passage located in a fixed position at a given portion of the conveyor.

According to the present invention, there is provided a method of unloading products off a continuously-moving conveyor, the products being conveyed by the conveyor inside respective seats, and being unloaded through a passage located in a fixed position at a given portion of the conveyor; characterized by the fact that said products are unloaded using an auxiliary seat located between the conveyor and the passage, and moving along the path of and at the same speed as the conveyor, and into selective alignment with each seat on the same; and a pusher constantly aligned with, and located on the opposite side of the conveyor in relation to, said auxiliary seat; and by the fact that said method comprises stages consisting in advancing said auxiliary seat in line with said product seat and said pusher; moving the pusher through said seat, for transferring said product from said seat into said auxiliary seat; arresting the auxiliary seat and the pusher in an unloading position aligned with said passage; and moving said pusher further at a predetermined speed for transferring the product from the auxiliary seat into said passage.

According to a preferred embodiment of the present invention, said passage defines the input of a further conveyor having an output portion traveling at a slower speed than said predetermined speed; the above method preferably also comprising a further stage consisting in feeding said products along the input portion of said further conveyor at a speed equal, at least temporarily, to said predetermined speed, for receiving the products successively expelled from said auxiliary seat by said pusher, and feeding them on to said output portion.

The present invention also relates to a device for unloading products off a continuously-moving conveyor.

According to the present invention, there is provided a device for unloading products off a continuously-moving conveyor and through a passage located in a fixed position at a given portion of the conveyor, which presents a number of seats for receiving respective said products; characterized by the fact that it comprises an auxiliary seat located between the conveyor and the passage; a pusher located on the opposite side of the conveyor in relation to the auxiliary seat; first actuating means for moving the auxiliary seat and the pusher along the path of said seats at the same speed as the conveyor and into selective alignment with each seat on the conveyor, and to and from an unloading position wherein the auxiliary seat and the pusher are aligned with said passage; and second actuating means for moving said pusher to and from said passage through said seats and at a predetermined speed.

The above device preferably also comprises a further conveyor, the input of which is defined by said passage; said further conveyor comprising an input conveyor and an output conveyor coaxial with each other; the output conveyor traveling at a slower speed than said predetermined speed; and the input conveyor being located adjacent to said passage, and traveling at a speed equal, at least temporarily, to said predetermined speed, for receiving the products expelled successively from said auxiliary seat by said pusher, and feeding them on to said output conveyor.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
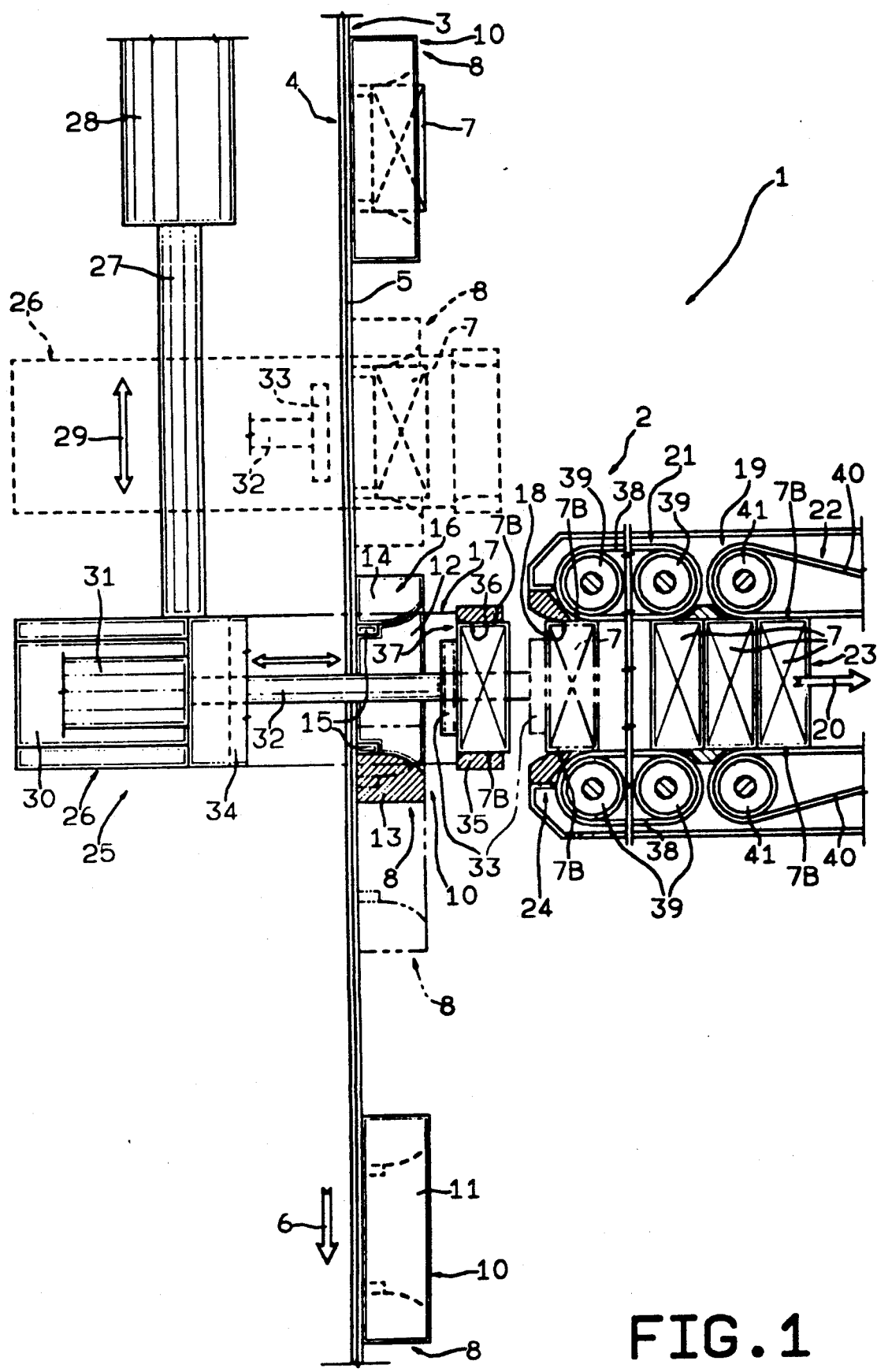
FIG. 1 shows a schematic, partially sectioned side view, with parts removed for clarity, of a portion of a cigarette packing machine featuring an unloading device implementing the method according to the present invention.

Number 1 in FIG. 1 indicates a cigarette packing machine of the type described in Italian Patent Application n. BO91A 000019 to which full reference is made herein in the interest of full disclosure.

Machine 1 comprises an output portion 2 in turn comprising a loop conveyor 3, the belt 4 of which comprises a straight branch 5 parallel to the FIG. 1 plane and which, in the example shown, is substantially vertical. The bottom portion of branch 5 is located facing the outer edge of a packing wheel (not shown), and travels axially downwards in the direction of arrow 6 (FIG. 1) at a speed substantially equal, in absolute value, to the surface speed of the packing wheel.

The packing wheel provides for successively feeding packets of cigarettes 7 into respective seats 8 equally spaced along belt 4 and each having a substantially rectangular connecting plate 9 (FIG. 2) connected to and extending across belt 4, for supporting respective seat 8 in projecting manner in relation to belt 4.

Each seat 8 is substantially defined by a substantially rectangular frame 10 having its longitudinal axis perpendicular to that of belt 4, and comprising two short sides defined by two shoulders 11 and 12 parallel to belt 4, and of which shoulder 12 is connected integral with plate 9; and two long sides defined by two cross members 13 and 14 located transversely in relation to belt 4, and having respective inner beads 15 defining a supporting surface for packet 7.

Each packet 7 is transferred from the packing wheel to seat 8 so that the two end walls 7a contact shoulders 11 and 12, and the two smaller longitudinal walls 7b contact cross members 13 and 14. More specifically, as on known packing machines, longitudinal walls 7b of each packet 7 are defined by folding two tabs (not shown) one on top of the other, the outer tab being folded on to the inner one as each packet 7 is inserted inside seat 8. For this purpose, cross members 13 and 14 present. rounded inner edges, so as to act as spindles for finish folding packets 7, which are arranged inside respective seats 8 with the free lateral edges of the outer tabs (not shown) of longitudinal walls 7b facing outwards in relation to belt 4.

Cross member 14, upstream from cross member 13 in the direction of arrow 6, is divided into two portions by a central opening 16.

At unloading station 17, the top portion of branch 5 of belt 4 is located facing the input passage 18 of a drying conveyor 19 extending in direction 20 perpendicular to the plane of branch 5, and comprising (FIG. 1) an input conveyor 21 and an output conveyor 22 coaxial with each other and with passage 18, for feeding in direction 20 a line 23 of packets 7 successively inserted through passage 18. Passage 18 is located adjacent to the input end of input conveyor 21, and is defined by a substantially rectangular frame 24 of substantially the same shape and size as seat 8.

In addition to conveyors 3 and 19 and the packing wheel (not shown), output portion 2 of machine 1 also comprises a device 25 for unloading packets 7 from respective seats 8 at unloading station 17.

Device 25 comprises a carriage 26 connected integral with the output rod 27 of a double-acting linear actuator 28 by which it is moved, in direction 29 parallel to arrow 6 and perpendicular to direction 20, between an idle and an operating position as shown respectively by the dotted and continuous lines in FIG. 1.

Figure 2:
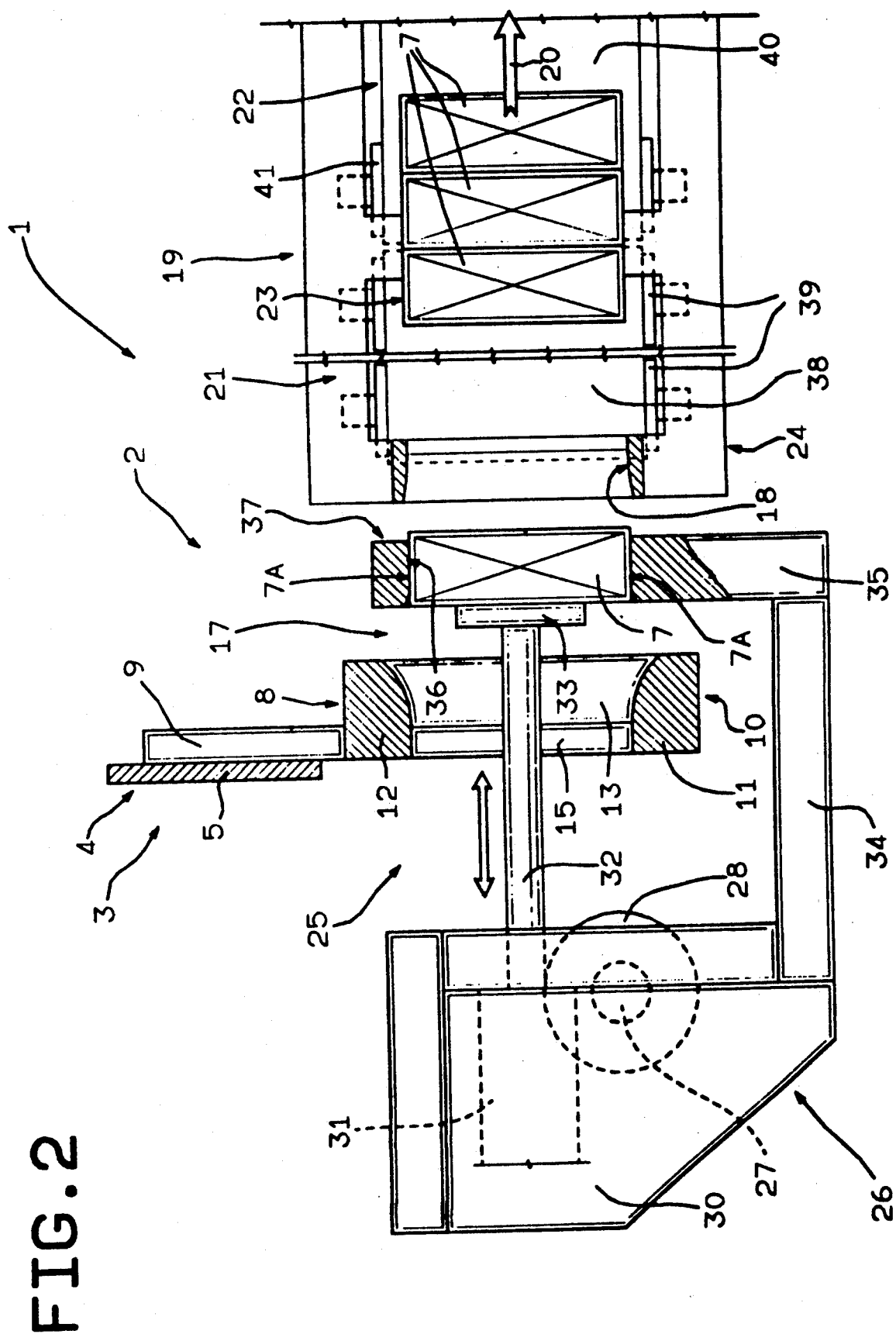
FIG. 2 shows a plan view of the machine portion in FIG. 1.

As shown more clearly in FIG. 2, when viewed from above, carriage 26 is substantially U-shaped, and comprises a body 30 located on the opposite side of branch 5 to passage 18, and supporting a double-acting linear actuator 31, the output rod 32 of which is parallel to direction 20 and fitted on its free end with a pusher 33. With carriage 26 in the operating position shown in FIG. 1, pusher 33 is positioned in line and coaxial with passage 18 at unloading station 17. Carriage 26 also comprises an arm 34 extending parallel to rod 32, to the side of branch 5, and fitted on its free end with an appendix 35 extending perpendicular to arm 34 in the gap between branch 5 and passage 18, and having an opening 36 of substantially the same shape and size as passage 18. Appendix 35 and opening 36 define an auxiliary seat 37 maintained permanently aligned with pusher 33 by arm 34.

As shown in FIG. 1, input conveyor 21 of conveyor 19 is defined by two looped belts 38 arranged facing each other and designed to contact walls 7b of packets 7. Each belt 38 is looped about two pulleys 39, one of which is powered for driving respective belt 38 at constant speed equal to the traveling speed of pusher 33 between auxiliary seat 37 and passage 18.

Similarly, output conveyor 22 of conveyor 19 is defined by two looped belts 40 arranged facing each other and designed to contact walls 7b of packets 7. Each belt 40 is looped about two pulleys 41 (only one shown), one of which is powered for driving respective belt 40 at a constant speed slower than that of belts 38.

Alternatively, the speed of belts 38 may be varied by means of a known variator (not shown), for enabling conveyor 21 to receive packets 7 from pusher 33 at the same speed as pusher 33, and to feed packets 7 to the input of output conveyor 22 at the same speed as conveyor 22, in which case, the length of belts 38 will preferably be such as to feed one packet 7 at a time along conveyor 21.

In actual use, as a seat 8, traveling at substantially constant speed along branch 5 of belt 4 in the direction of arrow 6, approaches unloading station 17, actuator 28 is operated for moving carriage 26 from the idle to the operating position. As it does so, carriage 26 eventually comes alongside seat 8 (position shown by the dotted line in FIG. 1) and travels towards unloading station 17 at the same speed as, and with pusher 33 and auxiliary seat 37 aligned with, seat 8.

At this point, it is therefore possible to transfer packet 7 from seat 8 to auxiliary seat 37 by operating actuator 31, and prior to reaching unloading station 17. Once packet 7 is loaded inside auxiliary seat 37, carriage 26 is arrested in station 17, with pusher 33 and auxiliary seat 37 aligned with passage 18.

At this point, as rod 32 disengages seat 8 through opening 16, and seat 8 withdraws from unloading station 17, pusher 33 continues moving forward so as to transfer packet 7 (position shown by the dot-and-dash line in FIG. 1) on to conveyor 19 through passage 18. Once packet 7 is transferred, pusher 33 and carriage 26 are restored to the idle position by actuators 31 and 28 respectively, pending the arrival of the next seat 8 in. unloading station 17.

As regards conveyor 19, it will be noted that packets 7 are fed between belts 38 of input conveyor 21 with the free edges (not shown) of the outer tabs (not shown) of respective walls 7b facing forwards in the direction of arrow 20, and, by virtue of belts 38 traveling, at least initially, at the same speed as pusher 33, no friction exists between the outer tabs of walls 7b and belts 38. Consequently, despite being fed between belts 38 with the free edges facing forwards, the outer tabs undergo no displacement in relation to the respective inner tabs (not shown).

Belts 38 provide for rapidly removing packets 7 from passage 18 and feeding them to the input of output conveyor 22, where they are accumulated contacting one another by virtue of the slower speed of output conveyor 22. As packets 7 are transferred from conveyor 21 to conveyor 22, assuming a constant speed of belts 38, the deceleration of packets 7 results in friction in the direction of arrow 20 between the outer tabs of walls 7b and belts 38, which friction is so directed as to effectively apply the outer tabs on to the respective inner tabs (not shown).

We claim:

1. A method of unloading products (7) off a continuously-moving conveyor (3), the products (7) being conveyed by the conveyor (3) inside respective seats (8), and being unloaded through a passage (18) located in a fixed position at a given portion of the conveyor (3); characterized by the fact that said products (7) are unloaded using an auxiliary seat (37) located between the conveyor (3) and the passage (18), and moving along the path of and at the same speed as the conveyor (3), and into selective alignment with each seat (8) on the same; and a pusher (33) constantly aligned with, and located on the opposite side of the conveyor (3) in relation to, said auxiliary seat (37); and by the fact that said method comprises stages consisting in advancing said auxiliary seat (37) in line with said product seat (8) and said pusher (33); moving the pusher (33) through said seat (8), for transferring said product (7) from said seat (8) into said auxiliary seat (37); arresting the auxiliary seat (37) and the pusher (33) in an unloading position (17) aligned with said passage (18); and moving said pusher (33) further at a predetermined speed for transferring the product (7) from the auxiliary seat (37) into said passage (18).

2. A method as claimed in claim 1, characterized by the fact that said passage (18) defines the input of a further conveyor (19) having an output portion (22) traveling at a slower speed than said predetermined speed; said method comprising a further stage consisting in feeding said products (7) along the input portion (21) of said further conveyor (19) at a speed substantially equal, at least temporarily, to said predetermined speed, for receiving the products (7) successively expelled from said auxiliary seat (37) by said pusher (33), and feeding them to said output portion (22).

3. A device for unloading products (7) off a continuously-moving conveyor (3) and through a passage (18) located in a fixed position at a given portion of the conveyor (3), which presents a number of seats (8) for receiving respective said products (7); characterized by the fact that it comprises an auxiliary seat (37) located between the conveyor (3) and the passage (18); a pusher (33) located on the opposite side of the conveyor (3) in relation to the auxiliary seat (37); first actuating means (28) for moving the auxiliary seat (37) and the pusher (33) along the path of said seats (8) at the same speed as the conveyor (3) and into selective alignment with each seat (8) on the conveyor (3), and to and from an unloading position (17) wherein the auxiliary seat (37) and the pusher (33) are aligned with said passage (18); and second actuating means (31) for moving said pusher (33) to and from said passage (18) through said seats (8) and at a predetermined speed.

4. A device as claimed in claim 3, characterized by the fact that it also comprises a further conveyor (19) the input of which is defined by said passage (18); said further conveyor comprising an input conveyor (21) and an output conveyor (22) coaxial with each other; the output conveyor (22) traveling at a slower speed than said predetermined speed; and the input conveyor (21) being located adjacent to said passage (18) and traveling at a speed substantially equal, at least temporarily, to said predetermined speed, for receiving the products (7) expelled successively from said auxiliary seat (37) by said pusher (33), and feeding them on to said output conveyor (22).

5. A device as claimed in claim 3, characterized by the fact that said second actuating means (31) comprise a movable rod (32) for operating said pusher (33); each said seat (8) comprising an annular frame (10) perpendicular to said rod (32) and having an opening (16) of such a width as to enable the rod (32) to move transversely in relation to the frame (10) between a first position wherein the rod (32) is located through the frame (10), and a second position wherein the rod (32) is located outside the frame (10).

6. A device as claimed in claim 5, characterized by the fact that said opening (16) extends through a portion of said frame (10) located upstream in relation to the traveling direction of the frame (10) towards said unloading station (17).

7. A device as claimed in claim 3, characterized by the fact that it also comprises a common support (26) for said auxiliary seat (37) and said pusher (33); said common support (26) being connected to said first actuating means (28) so as to move, by virtue of said first actuating means (28), along the path of said seats (8).

8. A device as claimed in claim 7, characterized by the fact that said second actuating means (31) are fitted to said common support (26).

* * * * *